Dec. 5, 1933.  P. A. SCHERER ET AL  1,937,984
REFRIGERATING CONTROL SYSTEM AND METHOD
Filed June 24, 1930   3 Sheets-Sheet 2
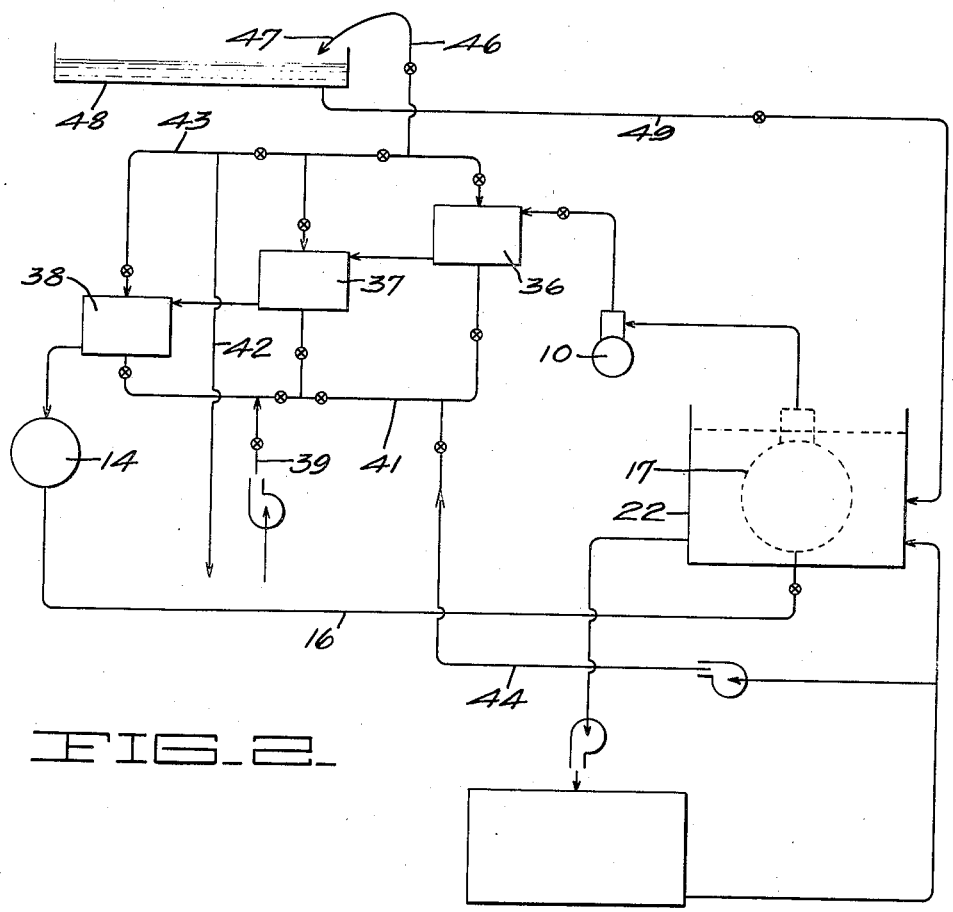
FIG_2_
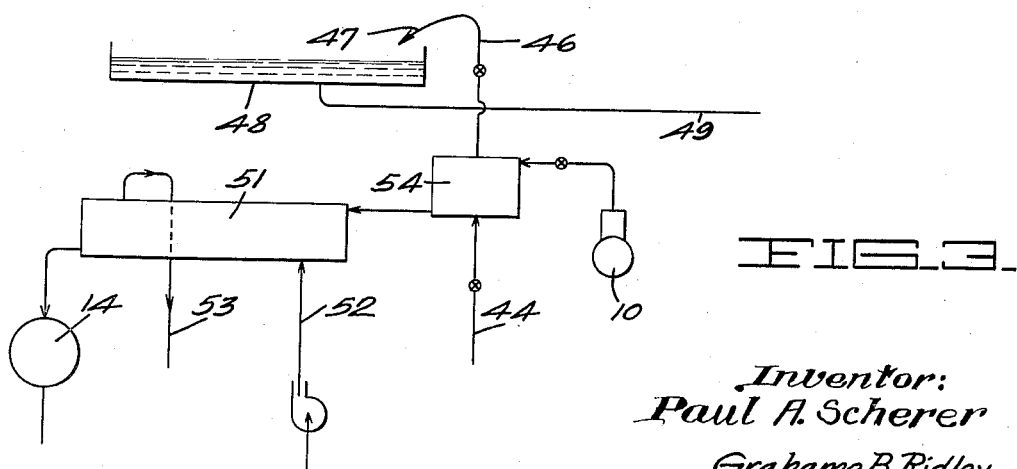
FIG_3_
Inventor:
Paul A. Scherer
Grahame B. Ridley
BY White, Prost, Flehr & Lothrop
ATTORNEYS.

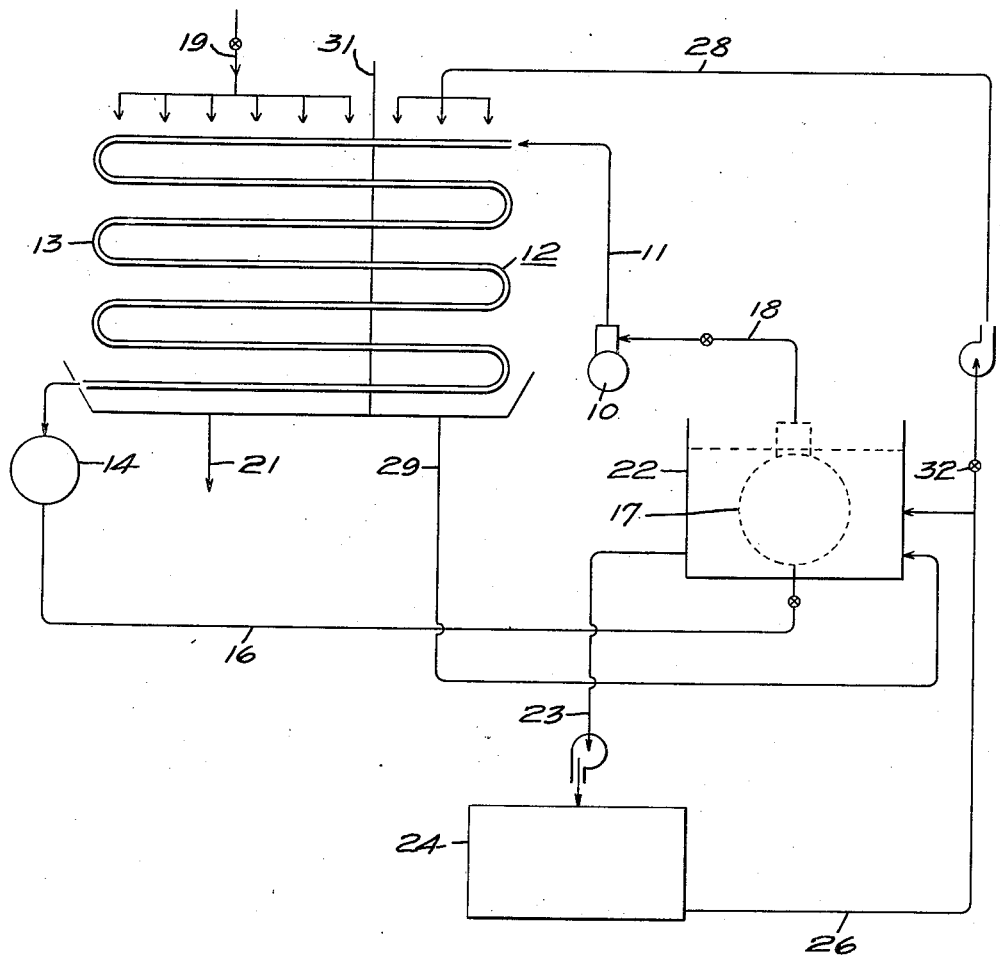

Inventor:
Paul A. Scherer
Grahame B. Ridley
BY White, Prost, Hehr & Lothrop
ATTORNEYS.

Patented Dec. 5, 1933

1,937,984

UNITED STATES PATENT OFFICE 1,937,984

REFRIGERATING CONTROL SYSTEM AND METHOD

Paul A. Scherer, Medford, Oreg., and Grahame B. Ridley, San Francisco, Calif., assignors to Southern Oregon Sales Inc., Medford, Oreg., a corporation of Oregon Application June 24, 1930. Serial No. 463,544

6 Claims. (Cl. 62—101)

This invention relates generally to systems for producing and maintaining refrigerating temperatures, and particularly to means and methods for effecting control of such systems.

Refrigerating systems commonly utilize a thermo-dynamic cycle in which a suitable fluid refrigerant such as ammonia, is compressed and then delivered to heat exchange means for removing heat from the same. The condensed fluid refrigerant from the heat exchange means is then permitted to volatilize within a suitable heat absorber, and the refrigerant vapor is returned to the compressor. The medium to be refrigerated is either directly contacted with the heat absorber, or in some systems brine solution is cooled by the heat absorber and the cold brine then absorbs heat from the medium to be refrigerated. It is desirable in such systems to be able to vary or control the refrigerating capacity. For example in systems for the refrigeration of stored fruit products, the system must accommodate varying quantities of fruit which are stored at different times, in order to maintain a substantially constant refrigeration temperature, and in order to quickly chill new products placed within the storage compartment within the shortest possible interval of time. Furthermore the capacity of the system must be controlled to compensate for varying climatic conditions.

In the past such refrigerating systems have been controlled by varying the rate of circulation of the fluid refrigerant within the refrigeration cycle. Such methods are objectionable as they require special compressing apparatus, as for example a plurality of separate compressing units which can be cut in and out at will, or compressors of adjustable capacity. Furthermore special compressing means of this character is frequently relatively inefficient, as well as expensive to install and maintain.

It is therefore an object of the present invention to devise novel and improved means and methods for controlling the capacity of the refrigerating system.

It is a further object of the invention to devise a novel refrigerating system and method which not only makes possible a variation in the refrigerating capacity, but will also serve to recondition brine solution which is brought into contact with the medium being cooled.

Further objects of the invention will appear from the following description in which the preferred embodiments of the invention are set forth in detail in conjunction with the accompanying drawings. It is to be understood that the appended claims are to be accorded a range of equivalents consistent with the state of the prior art.

Referring to the drawings:

Figure 1 is a diagrammatic view illustrating a system incorporating the present invention.

Figs. 2 and 3 are diagrammatic views illustrating modified refrigerating systems incorporating the invention.

Figure 4:
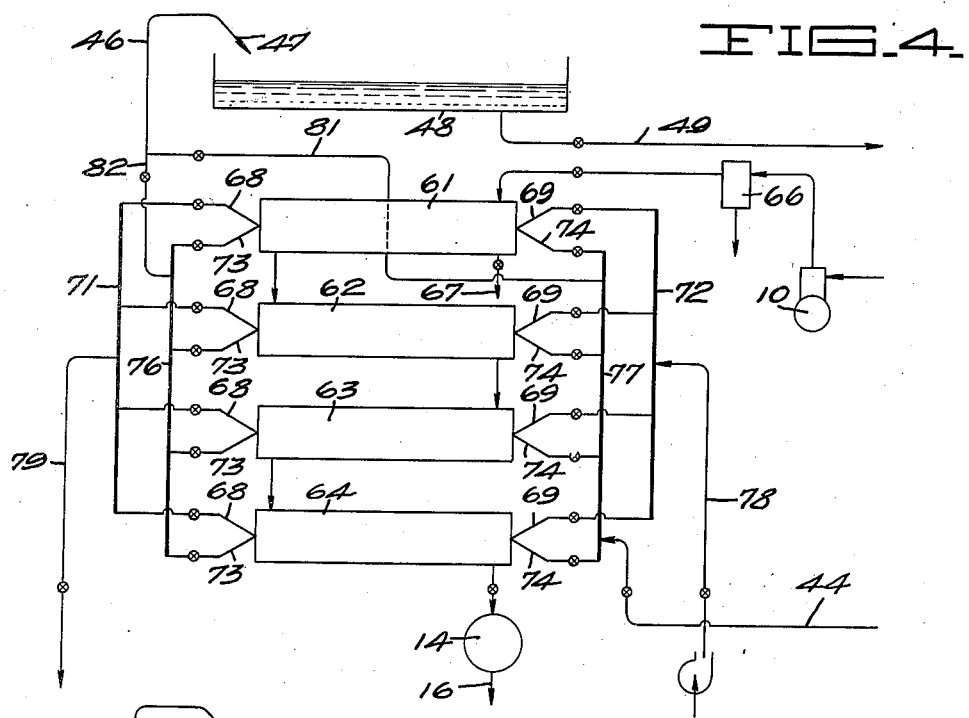
Figs. 4 and 5 illustrate diagrammatically further modifications of our system, relating particularly to the arrangement and mode of operation of the heat exchange means for cooling and condensing the fluid refrigerant.

The present invention is characterized by an exchange of a controllable amount of heat between different parts of the refrigeration cycle. Such an exchange of heat when properly controlled serves as a means for varying the refrigeration capacity of the system, even though the rate of circulation of the fluid refrigerant is kept constant. The system as represented in Fig. 1 consists of a suitable compressor 10, the high pressure side of which is connected by pipe 11 with suitable heat exchange means 12. In this instance the heat exchange means has been represented by a length of piping or tubing 13, which has its discharge end connected to a suitable receiver 14 for collecting condensed refrigerant. Pipe 16 serves to convey the condensed refrigerant from receiver 14 to the heat absorber 17. The volatilized refrigerant from absorber 17 is reintroduced into the intake of compressor 10 thru pipe 18.

In order to cool heat exchange means 12, a pipe 19 has been indicated for discharging cool liquid such as water over pipe 13, the water after absorption of heat being removed thru pipe 21. If the cooling water is to be reused, it is cooled and again introduced thru pipe 19. While in certain modifications of the system absorber 17 may be directly contacted with the medium to be refrigerated, it is shown in this instance immersed within a brine solution tank 22. In order to establish a brine recirculation cycle, brine can be removed from this tank thru pipe 23 and passed thru a suitable heat absorber 24. From heat absorber 24 the solution can be returned by gravity or by means of a pump, thru pipe 26. Absorber 24 can be suitably arranged to absorb heat from the medium to be refrigerated, as for example it can be associated with a storage compartment for products such as fruit, so as to absorb heat from the air within the compartment.

In order to provide convenient means for effecting a transfer of heat between absorber 17 and heat exchange means 12. It has been found desirable to divert a certain amount of the brine solution from the brine recirculation cycle, and to contact this brine with the heat exchange means 12. Thus there is shown a pipe 28 connected to the brine recirculation cycle, as for example with pipe 26, and this pipe serves to deliver brine solution to a portion of the tubing 13 as indicated. After contacting the diverted brine solution with the heat exchange means, it can be returned to the brine recirculation cycle thru pipe 29. It is evident that intermixing of the brine solution with the cooling water for heat exchange means 12 must be avoided, and for this reason we have indicated suitable means such as a wall 31 for properly segregating these liquids. The rate with which the brine solution is diverted and contacted with the heat absorber can be controlled by suitable means such as a valve 32.

When the system described above is operating at maximum capacity, no brine is being diverted thru pipe 28, and all heat subtracted from the fluid refrigerant in heat exchange means 13 is supplied by water introduced thru pipe 19. If it is desired to decrease the refrigerating capacity of the plant, valve 32 is opened to permit a certain diverted quantity of brine solution to be introduced thru pipe 28. This brine solution will then remove a certain amount of heat from the fluid refrigerant passing thru heat exchange means 12, and the heat so removed is introduced into the brine recirculation cycle because of the return of the warmer brine solution thru pipe 29. The net result of such a heat exchange between heat exchange means 12, and absorber 17, or the brine recirculation cycle, is to decrease the heat absorbing capacity of absorber 24. Causing an increased amount of diverted brine to contact with the heat exchange means 12 serves to further decrease the refrigerating capacity, although it is apparent that the limit to which the capacity can be decreased is determined by practical considerations. For example the capacity cannot be decreased to such an extent as to make the thermo-dynamic cycle of the fluid refrigerant inoperative. In other words when the system is operated at minimum capacity the fluid refrigerant must still be volatilized within heat absorber 17. To secure best overall efficiency at any one capacity setting, the amount of heat absorbed by the water introduced thru pipe 19, is reduced to a minimum to secure proper operation. A reduction in capacity in the manner explained above is also accompanied by a reduction in horse power consumption.

In practice heat absorber 24 is of such a type that it effects direct contact between the brine solution and air which is circulated thru the storage compartment. In refrigerating certain products such as fruit or vegetables, the air within the storage compartment will pick up moisture and also odors from the products, and the moisture and odors will in turn be picked up by the brine solution. Diversion of a certain amount of the brine solution accompanied by heating the same and exposure to the atmosphere, also serves in this instance to perform the novel function of reconditioning the brine solution. Thus the heated diverted portion of the solution which is exposed to the atmosphere, evolves water vapor and absorbed odors, thus tending to keep the brine concentration substantially constant and serving to make the system self-cleansing.

A modification of the system shown in Fig. 1 is illustrated in Fig. 2. In this case in place of employing a single heat exchanger connected to the high pressure side of compressor 10, we employ a plurality of heat exchange units 36, 37, and 38, which are connected together in series with respect to compressor 10 and receiver 14. These units may be of the multipass type such as are commonly employed in refrigerating systems. By means of pipe 39 cold cooling water can be supplied to one or more of the heat exchange units, thru the valve controlled pipe connection 41. After passing thru the heat exchange units the cooling water can be removed thru the valve controlled pipe connections 42 and pipe 43. If the water discharged thru pipe 42 is to be reused it is suitably cooled and again introduced thru pipe 39. A certain amount of the brine can be diverted thru the pipe 44, and this pipe is also associated with pipe connections 41, so that the diverted brine can be introduced thru one or more of the heat exchange units. Valve controlled pipe 46 serves to remove the brine solution after passage thru one or more of the heat exchange units, and to discharge the same thru a spray nozzle 47, into a receiver 48 which is exposed to the atmosphere. From receiver 48 the brine solution can be returned to the brine recirculation cycle thru pipe 49.

When the system of Fig. 2 is being operated at maximum capacity, no brine is being diverted thru pipe 44, and the valves associated with connections 41 and 43 are controlled in such a manner that water from pipe 39 is being passed thru all of the heat exchangers 36, 37 and 38. If it is desired to decrease the capacity of the system, the valves of connections 41 and 42 are controlled in such a manner as to isolate unit 36 from the cooling water introduced thru pipe 39, and unit 36 is then cooled only by brine solution diverted thru pipe 44, which is passed thru unit 36, and delivered by pipe 46 into receiver 48. From receiver 48 the brine which has absorbed heat from the fluid refrigerant is returned into brine tank 22 and the brine recirculation cycle. The capacity can be further reduced by increasing the rate of flow of the diverted brine thru unit 36, or by causing the diverted brine to pass thru both units 36 and 37 to the exclusion of unit 38, the latter alone being cooled by water introduced thru pipe 39.

In place of providing heat exchange units which can be isolated from the main cooling system and cooled by diverted brine, it is evident that we can provide a separate heat exchange unit distinct from the main water cooled condenser unit or units, and serving only to receive diverted brine solution. Such an arrangement is indicated in Fig. 3 in which the main heat exchange means 51 is cooled by water introduced thru pipe 52 and removed thru pipe 53. Between heat exchange means 51 and the compressor 10, there is an auxiliary heat exchanger 54, thru which varying quantities of brine solution can be introduced thru pipe 44 and removed thru pipe 46. The arrangement of Fig. 3 has the advantage of simplicity, while the arrangement of Fig. 2 provides greater flexibility and latitude in adjustments.

In Fig. 4 another novel arrangement of heat exchange units is shown for cooling and condensing the compressed refrigerant. In this case a plurality of exchange units 61, 62, 63 and 64 are provided. Compressed refrigerant from compressor 10 is passed thru a suitable oil separator 66, and then delivered to the first unit 61.

An oil which is condensed in this first unit can be removed as indicated by pipe 67. For circulating brine solution or cooling water thru the various units, valve controlled branch pipes 68 and 69, serve to connect the units with header pipes 71 and 72. Valve controlled branch pipes 73 and 74 also serve to connect the units with header pipes 76 and 77. Cooling water can be introduced into header pipe 72 thru pipes 78, and can be removed from header pipe 71 thru pipe 79. Pipe 44 can serve to deliver diverted brine solution to header pipe 77, and valve controlled pipes 81 and 82 connecting to both headers 76 and 77, can deliver brine thru pipe 46.

Figure 5:
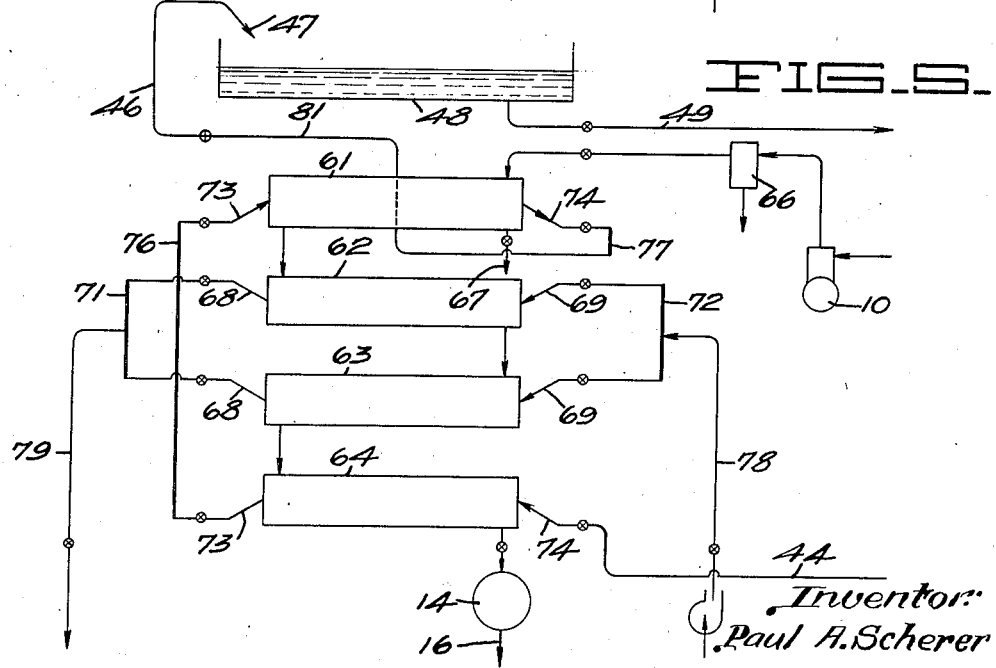

In operating the arrangement of Fig. 4 the valves of branch pipes 68 and 69, 73, 74, can be controlled in any desired manner so that any one of the heat exchange units is cooled by either brine solution or water. For example a controlled amount of diverted brine solution can be passed thru only the first unit 61 and the remainder of the units can be cooled by water. In this case it is evident that pipe 81 should be closed and brine removed from header 76, thru pipe 82 and pipe 46. In actual practice it has been found desirable to pass controlled quantities of diverted brine solution thru both the first and the last heat exchange units 61 and 64. By proper control of the valves, such operation is made possible as indicated in Fig. 5. In this case diverted brine solution from pipe 44 is passed first thru the last exchanger 64, and then thru the exchanger 61. The other exchangers 62 and 63 can be cooled by water as indicated. Passing the diverted brine solution thru the last heat exchange unit has a marked effect upon the capacity of the system, and as the capacity is reduced corresponding to the quantity or rate with which the brine solution is diverted, the horse power consumption of the system is also reduced because of the thermal recovery effected.

We claim:

1. A method of the character described characterized by the use of a heat absorber, compressing means connected to compress volatilized refrigerant removed from the heat absorber, heat exchange means connected to the compressing means and serving to condense compressed refrigerant and to return the same back to the absorber, and a brine recirculation cycle adapted to remove heat from said absorber; said method comprising causing a portion of the brine from said recirculation cycle to absorb heat from said heat exchange means.

2. A method of the class described characterized by the use of a heat absorber, compressing means connected to compress volatilized refrigerant removed from the heat absorber, heat exchange means connected to the compressing means and serving to condense compressed refrigerant and to return the same back to the absorber, and a brine recirculation cycle adapted to remove heat from said absorber; said method comprising diverting brine from said recirculation cycle, causing the diverted brine to absorb heat from said heat exchange means, and regulating the amount of heat so absorbed to regulate the refrigerating capacity of the apparatus.

3. A method of the class described characterized by the use of a heat absorber, compressing means connected to compress volatilized refrigerant from the heat absorber, heat exchange means connected to the compressing means and serving to condense compressed refrigerant and to return the same back to the absorber, and brine recirculation cycle adapted to remove heat from said absorber; said method comprising diverting a portion of the brine from said recirculation cycle, causing said diverted brine to absorb heat from said heat exchange means, controlling the amount of heat so absorbed to regulate the refrigerating capacity of the system, and returning the diverted brine portion back to the brine recirculation cycle.

4. In a refrigerating system, a compressor adapted to compress a fluid refrigerant, heat exchange means connected to the high pressure side of the compressor and adapted to condense compressed refrigerant, a heat absorber adapted to receive condensed refrigerant from said heat exchange means, and to return volatilized refrigerant to the compressor, means forming a brine recirculation cycle adapted to contact the brine with said absorber, and means for varying the refrigerating capacity of the system, said means including means for diverting controllable amounts of brine from said cycle and for contacting said brine with said heat exchange means.

5. A method of the character described, characterized by the use of a heat absorber, compressing means connected to compress volatilized refrigerant removed from the absorber, heat exchange means connected to the compressing means and serving to condense compressed refrigerant and to return the same back to the absorber; said method comprising effecting a heat exchange between the absorber and said heat exchange means by the use of a common contacting medium, also extracting heat from said heat exchange means by contacting the same with another medium, and varying the ratio, between the heat transferred from said heat exchange means to the first named medium, and the heat transferred from said heat exchange means to the second named medium, to regulate the refrigerating capacity of the system.

6. A method of the character described characterized by the use of a heat absorber, compressing means connected to compress volatilized refrigerant removed from the absorber, heat exchange means connected to the compressing means and serving to condense compressed refrigerant and to return the same back to the absorber; said method comprising effecting a heat exchange between the absorber and said heat exchange means by the use of a common contacting fluid medium, also extracting heat from said heat exchange means by contacting the same with another fluid medium, and varying the ratio, between the heat transferred from said heat exchange means to the first named fluid medium, and the heat transferred from said heat exchange means to the second named fluid medium, to regulate the refrigerating capacity of the system.

GRAHAME B. RIDLEY.
PAUL A. SCHERER.